US008695056B2

(12) United States Patent
Banerjee et al.

(10) Patent No.: US 8,695,056 B2
(45) Date of Patent: Apr. 8, 2014

(54) METHOD FOR INFORMATION TRACKING IN MULTIPLE INTERDEPENDENT DIMENSIONS

(75) Inventors: Anindya Banerjee, Lawrence, KS (US); Marco Pistoia, Amawalk, NY (US); Avraham Shinnar, Somerville, MA (US)

(73) Assignee: International Business Machines Corporation, Armonk, NY (US)

( * ) Notice: Subject to any disclaimer, the term of this patent is extended or adjusted under 35 U.S.C. 154(b) by 1389 days.

(21) Appl. No.: 12/020,530

(22) Filed: Jan. 26, 2008

(65) Prior Publication Data

US 2009/0193492 A1    Jul. 30, 2009

(51) Int. Cl.
*G06F 17/00* (2006.01)

(52) U.S. Cl.
USPC ........ 726/1; 726/22; 726/30; 726/33; 726/26; 713/166; 713/167; 713/193; 713/180; 705/57; 718/1

(58) Field of Classification Search
USPC ........................... 726/1, 23–26; 713/167, 189
See application file for complete search history.

(56) References Cited

U.S. PATENT DOCUMENTS

| 6,708,224 | B1 | 3/2004 | Tsun et al. |
| 7,287,140 | B1 * | 10/2007 | Asanovic et al. ............. 711/163 |
| 7,590,866 | B2 * | 9/2009 | Hurtado et al. ............... 713/189 |
| 7,734,600 | B1 * | 6/2010 | Wise et al. .................... 707/694 |
| 7,743,423 | B2 * | 6/2010 | Lange et al. ..................... 726/26 |
| 7,770,202 | B2 * | 8/2010 | Brumme et al. .................. 726/1 |
| 8,180,708 | B2 * | 5/2012 | Hurtado et al. ................. 705/57 |
| 8,234,641 | B2 * | 7/2012 | Fitzgerald et al. ............... 718/1 |
| 8,370,388 | B2 * | 2/2013 | Kilday et al. .................. 707/781 |
| 8,464,066 | B1 * | 6/2013 | Price et al. ..................... 713/180 |
| 8,555,403 | B1 * | 10/2013 | Kilday ............................. 726/27 |
| 2004/0117783 | A1 | 6/2004 | Kaminsky et al. |
| 2005/0172133 | A1 * | 8/2005 | Brumme et al. ............... 713/182 |
| 2006/0070043 | A1 | 3/2006 | Viega |
| 2006/0225107 | A1 * | 10/2006 | Seetharaman et al. ........ 725/100 |
| 2007/0143601 | A1 | 6/2007 | Arroyo |
| 2007/0240194 | A1 * | 10/2007 | Hargrave et al. .................. 726/1 |
| 2008/0172747 | A1 * | 7/2008 | Hurtado et al. ................. 726/26 |
| 2008/0201760 | A1 * | 8/2008 | Centonze et al. .................. 726/1 |
| 2011/0047618 | A1 * | 2/2011 | Evans et al. ..................... 726/23 |

OTHER PUBLICATIONS

Sloman M, Security and Managment Policy Specificaiton, Aug. 2002, IEEE, vol. 16, pp. 10-19.*

* cited by examiner

*Primary Examiner* — Cordelia Zecher
*Assistant Examiner* — Viral Lakhia
(74) *Attorney, Agent, or Firm* — August Law, LLC; George Willinghan (57) ABSTRACT

A method for information flow tracking is provided using, for example, a functional programming language based on lambda calculus, $\lambda_I$. The method provides a unified information-tracking framework that supports multiple, interdependent dimensions of information. An expressive policy-specification system is separated from the underlying information-flow tracking mechanism. Arbitrary domain-specific policies are supported that can be developed and enforced independent of information flow tracking. Information-flow metadata is treated as a first-class entity, and information flow is correctly tracked on the metadata itself. Classes of information flow polices are defined using multiple dimensions that are application to both information flow data and to the information flows themselves. These classes of polices accurately model more realistic security policies, based on partial trust relations. Therefore, multiple interdependent dimensions of information are simultaneously tracked and enforced within the framework of the information flow tracking system.

20 Claims, 6 Drawing Sheets

Graphical Representation of the Court-Case Scenario

FIG. 1

Variables                    $x, m$
Field Names                  $f$
Commands ($C$)               $C ::= v \mid \text{let } x = C \text{ in } C \mid \text{ref } v \mid !v \mid v ::= v \mid$   values, let, create/read/write references
                             $\text{true} \mid \text{false} \mid n \mid \text{unit} \mid \text{null} \mid$   primitive value intro forms
                             $\text{struct } \{\overline{f = v}\} \mid v.f \mid$   intro/elim form for records
                             $\text{frame } v \text{ with } v \mid \text{frameof } v \mid \text{valueof } v \mid$   intro/elim forms for framed values
                             $\text{fun } m\, x \Rightarrow C \mid v\, v \mid \text{if } v \text{ then } C \text{ else } C$   method definition, application, conditional Atomic Denotations ($A$)     $a ::= \text{true} \mid \text{false} \mid n \mid \text{unit} \mid \text{null} \mid l \mid \langle m, x, C \rangle$   primitive values, locations, closures
Denotations ($D$)            $d, R ::= a \mid \{\overline{f = d}\} \mid R[a]$   atomics, structures, frames
Value ($V$)                  $v ::= x \mid d$   variables, denotations Frame Language Syntax

FIG. 2

PRIMITIVE INTROS
$(true, h) \downarrow (true, h)...$

LET
$$\frac{(C_1, h) \downarrow (d_1, h_1) \quad (C_2[\{d_1/x\}], h_1) \downarrow (d, h')}{(let\, x = C_1\, in\, C_2, h) \downarrow (d, h')}$$

REF
$$\frac{\ell \notin dom(h) \quad passive\, d}{(ref\, d, h) \downarrow (\ell, [h|\ell \mapsto d])}$$

ASSIGNMENT
$$\frac{passive\, d}{(\ell := d, h) \downarrow (unit, [h|\ell \mapsto d])}$$

DEREFERENCING
$(!R[\ell], h) \downarrow ((h\ell), h)$

STRUCTURE CREATION
$(struct\, \{\overline{f} = \overline{d}\}, h) \downarrow (\{\overline{f} = \overline{d}\}, h)$ FIELD PROJECTION
$(\{f_i = d_i\}.f_i, h) \downarrow (d_i, h)$ FRAMING
$(framed\, with\, R, h) \downarrow (R[d], h)$ FRAME PROJECTION
$(frameof\, R[d], h) \downarrow (R, h)$ VALUE PROJECTION
$(valueof\, R[d], h) \downarrow (d, h)$ METHOD DEFINITION
$(fun\, m\, x \Rightarrow C, h) \downarrow (\langle m, x, C \rangle, h)$ METHOD APPLICATION
$$\frac{(C[\{d/x\}][\langle m, x, C\rangle/m], h) \downarrow (d', h')}{(R[\langle m, x, C\rangle]d, h) \downarrow (d', h')}$$

IF TRUE
$$\frac{(C_1, h) \downarrow (d, h')\, passived}{(if\, R[true]\, then\, C_1\, else\, C_2, h) \downarrow (d, h')}$$

IF FALSE
$$\frac{(C_2, h) \downarrow (d, h')\, passived}{(if\, R[false]\, then\, C_1\, else\, C_2, h) \downarrow (d, h')}$$

Frame Language Semantics

FIG. 3

NULL ABSORPTION: $null[d_1][null][d_2] = d_1[d_2]$
STRUCT LIFTING: $d \equiv \{1 = d\}$
DISTRIBUTION: $d[\overline{\{f_i = d_i\}}] \equiv \{\overline{f_i = d[d_i]}\}$ Frame Canonicalization

FIG. 4

PASSIVE: A denotation $d$ is passive if it does not include any closures (in all sub-frames/structures)

Passive Denotations

FIG. 5

Commands $C ::= \ldots \mid \text{getpc} \mid \text{getstatic} \mid v.f ::= v \mid \text{assert } R \text{ in } C$    $\lambda_I$ commands are a superset of $\lambda_F$ commands Information Flow Language Syntax

FIG. 6

| Translation of Commands | Translation of the top level program: $T_p(C) =$ let $pc =$ ref null in let static $=$ ref null in $[C]$ |
|---|---|

$[v] = v$
$[frameof\ v] = frameof\ v$
$[fun\ m\ x \Rightarrow C] = fun\ m\ x \Rightarrow [C]$
$[let\ x = C_1\ in\ C_2] = let\ x = [C_1]\ in\ [C_2]$ $[ref\ v] = ref\ taint(v)$
$[valueof\ v] = valueof\ v$
$[v.f] = v.f$
$[getpc] =\ !pc$ $[v] = frame\ !v\ with\ (frameof\ v)$
$[frame\ v_1\ with\ v_2] = frame\ v_1\ with\ v_2$
$[struct\{\overline{f = v}\}] = struct\{\overline{f = v}\}$
$[getstatic] =\ !static$ $[v_1.f_1.f_2....f_n := v_2]$
$= v_1' := taint\_field(!v_1, [f_1, f_2,...,f_n], v_2)$ $[v_1\ v_2] = let\ R = frameof\ v_1\ in$
$\quad let\ v_2' = frame\ v_2\ with\ !static\ in$
$\quad set(static = R)\ in$
$\quad set(pc = taint(R))\ in$
$\quad frame(v_1, v_2')\ with\ R$ $[assert\ R\ in\ C] = let\ R' = frame\ R\ with\ !static\ in$
$\quad set(pc = R')\ in\ [C]$ $[if\ v\ then\ C_1\ else\ C_2] = let\ R = frameof\ v\ in$
$\quad set(pc = taint(R))\ in$
$\quad let\ y = if\ !v\ then\ [C_1]\ else\ [C_2]\ in$
$\quad tainter(wo(C_1) \cup wo(C_2))$;
$\quad frame\ y\ with\ R$ With the following helper functions:

$C_1; C_2 \equiv let\ \_ = C_1\ in\ C_2$
$taint(v) \equiv frame\ v\ with\ !pc$
$taint\_field(v_1,\ ,v_2) \equiv taint(v_2)$ $tainter(set) \equiv foldl(;)unit(map$
$\quad (\lambda(v, fl) \to$
$\quad v := taint\_field(v, fl, !v.f_0.f_1...f_n))\ set)$ In the following, $f_k$ ranges over the filed names of $v_1$, and $f = f_i$ $taint\_field(v_1, f :: fl, v_2) \equiv let\ \overline{x_k = v_1.f_k}\ in$
$\quad let\ z = taint\_field(x_i, fl, v_2)\ in$
$\quad struct\{\overline{f_0 = x_0,...,f_{i-1}},$
$\quad f_i = z, \overline{f_{i+1} = x_{i+1},...}\}$ $set(var = R) \equiv let\ old =\ !var\ in$
$\quad var := frame\ null\ with\ R;$
$\quad in\ C \quad let\ ret = C\ in$
$\quad \quad var := old;$
$\quad \quad ret$ $v := taint\_field(v, f,\ ;\ !v.f_0.f_1,...,f_n\ )\ set)$ Information Flow Language → Frame Language Translation

FIG. 7

Location = "Shire"
If (b) location = "Mordor";
Destroy (location);
Branch Not Taken

FIG. 8

$wo(C)$ returns a set $\{(v, \vec{f})\}$ of value, field-list pairs, where the values have ref types. Every path $v.f_1.....f_n$ that $C$ may assign to must be in this set.
*Remark: Note that the write oracle may be conservative, but must be sound.*

Write Oracle: $wo$

FIG. 9

$if(b) \ (fun \ a \ x \Rightarrow n := 5)$
$else \ (fun \ a \ x \Rightarrow unit)$
Conditionally Returning a Closure

FIG. 10

METHOD FOR INFORMATION TRACKING IN MULTIPLE INTERDEPENDENT DIMENSIONS

FIELD OF THE INVENTION

The present invention relates to information-flow tracking and information-flow policy enforcement.

BACKGROUND OF THE INVENTION

There is a need for information-flow systems that allow for expressive policy specifications. For example, in existing systems, such as Java and the Common Language Runtime (CLR), integrity levels are represented as sets of permissions, as described, for example, in Marco Pistoia, Anindya Banerjee, and David A. Naumann, *Beyond Stack Inspection: A Unified Access Control and Information Flow Security Model*, 28th IEEE Symposium on Security and Privacy, pages 149-163, Oakland, Calif., USA, May 2007. Each permission has the power to specify which resources it guards. Permissions are assigned to code by the class loader that loaded that code. Not all class loaders are equally trusted. Every program can implement its own class loader, which may then assign arbitrary permissions to every class it loads. A partially trusted class loader has the power to make the classes it loads completely trusted by assigning them AllPermission. Therefore, Li Gong, Gary Ellison, and Mary Dageforde, *Inside Java 2 Platform Security: Architecture API Design, and Implementation*, Addison-Wesley, Reading, Mass., USA, second edition, May 2003 and Marco Pistoia, Duane Reller, Deepak Gupta, Milind Nagnur, and Ashok K. Ramani, *Java 2 Network Security*, Prentice Hall PTR, Upper Saddle River, N.J., USA, second edition, August 1999 emphasized that partially trusted class loaders do not exist and that whoever has the power to create a new class loader is implicitly granted AllPermission.

A fundamental problem is that extant information-flow systems are insufficiently expressive. For example, the problem above is caused by the inability to consider information flow itself as information. The fact that a class C has been granted an integrity level R by a principal S should be trusted no more than S. Therefore, it is crucial that R be assigned the integrity level S of the class loader that assigned R to C. The statement that C was granted R should be trusted as much as S is trusted. In the sequel, this is written as S[R][C] using the framing notation from Fournet and Gordon, Cedric Fournet and Andrew D. Gordon, *Stack Inspection: Theory and Variants*, Proceedings of the 29th ACM S1GPLAN-SIGACT Symposium on Principles of Programming Languages (POPL 2002), pages 307-318, Portland, Oreg., USA, January 2002, ACM Press. Frame R denotes the integrity level of C, and frame S denotes the integrity level of R[C].

Another lack of expressivity, common in existing systems, is the inability to track influences on information-flow decisions made by the enforcement mechanism itself. For example, in standard Java and CLR security models, it is impossible to define partially trusted integrity enforcement mechanisms. Once a security manager is installed, it has the power to enforce any policy it desires by overriding the system administrator's policy decisions and by making any security check succeed. This permits granting AllPermission to arbitrary code. The fundamental problem in these models is that any decision made by an integrity enforcement mechanism is going to be considered completely trusted. For example, a security manager with trust level S returning true on an information-flow check should actually return S[true], thereby recording S's influence on true.

Systems make decisions based on trust or secrecy levels. In an integrity domain, if an intruder can trick a program into using a value with a specific trust level and the program branches over that trust level, for example, in Java's checkPermission and the CLR's Demand, the intruder will have caused an integrity violation, not through the value itself, but through the trust level of that value. Consider the case of a library method m with parameter A a. If m invokes a.foo, an intruder could inject an untrusted version of a.foo, U[a.foo], in the program by simply passing an instance of a subclass of A that is trusted only up to U. Alternatively, the intruder could decide to inject a trusted version of a.foo, T[a.foo]. At the point in which an authorization check involving a.foo is made, for example, through stack inspection in Java and the CLR, performed while a.foo is on the stack, failure and success of the check depend on the frame, U or T, of a.foo. Therefore, a malicious attacker could use the frame of a.foo as a form of storage channel to make the program take a certain branch. The fundamental problem here is that the frame of a.foo is not itself framed with the integrity level of the intruder that made the decision of which version of a.foo to pass. Of course, this problem can affect more than two levels of integrity. There is, therefore, a need for potentially unbounded levels of framing.

In a confidentiality domain, the fact that a given value v has a particular secrecy level S could itself be confidential information, perhaps with a secrecy level R≠S. The release of R may constitute as much of a confidentiality violation as the release of v. Secrecy and trust levels can be nested further and can also be interdependent. For example, a secrecy level can have an integrity level and that integrity level can have a secrecy level. Further dimensions of information flow that go beyond integrity and confidentiality may be involved in a policy decision, and these multiple dimensions can be interdependent. There is, therefore, the need for specifying and enforcing information-flow policies with multiple, interdependent dimensions.

SUMMARY OF THE INVENTION

Systems and methods in accordance with the present invention provide for the propagation of different dimensions of information such that the different dimensions can be interdependent. Different dimensions of information are tracked during the execution of a program, i.e., at run time. Systems and methods in accordance with exemplary embodiments of the present invention provide for automatic and dynamic tracking of information-flow dependencies, which can vary depending on new components installed in the program. The tracked dependencies and the enforcement mechanism are customizable. The present invention does beyond simple authorization and tracks information flow. Once the tracking is done, a determination is made regarding the conditions under which information flow can be enforced while maintaining the validity of the principle of non-interference. Systems and methods in accordance with the present invention allow for precise tracking and complete enforcement in a realistic model based on limited trust.

In accordance with one exemplary embodiment, the present invention is directed to a method for information flow tracking where a plurality of dimensions is identified. Each one of these dimensions quantifies a property associated with information flows. These information flows are the data and control flows that result from the execution of computer programs in a given domain or across different domains. These dimensions can be used to quantify any desired or required quality in the propagated data flows or control flows including, for example, integrity, confidentiality, non-repudiation and provenance.

Interrelationaships between the various dimensions exist, and these interrelationships among the plurality of dimensions are maintained. As executing computer programs propagate information flows, including data flows and control flows, the data and metadata associated with each tracked information flow is accessed. Dimensional values can be associated with both the data and metadata of information flows, this includes different values for the same dimension resulting from data and metadata and values for a plurality of different dimensions associated with a single item of data or metadata. This results, overall in a plurality of different dimensions and a plurality of values for each one of the plurality of different dimensions. In addition, interrelationships exist among these values and dimensions. Using these dimensions and dimensional values, a multi-dimensional label is assigned to each tracked information flow. Each multi-dimensional label includes dimension values derived from the information flow data and dimension values derived from the information flow metadata. These assigned multi-dimensional labels are propagated with the associated tracked information flows.

The identified dimensions and the values assigned to those dimensions by the information flow data and metadata are used in enforcing policies that regulate the propagation of information flows generally and in particular that manage certain critical functions attempted by the information flows such as publishing confidential data. In one embodiment, plurality of information flow policies to be enforced on the tracked information flows is identified. Each information flow policy contains an identification of one or more of the dimensions and acceptable values or value ranges for these dimensions. These values of the identified dimensions and the interrelationships among the identified dimensions are used for policy enforcement. The labels, containing an identification of dimensions and dimensional values for a given information flow, are used for enforcement of the policies that are expressed as constraints on the dimension. Policy enforcement is triggered prior to an occurrence of an action controlled by at least one of the policies. Therefore, information flows are generally tracked and propagated separate from and independent of policy enforcement, even if events occur during tracking and propagation that could produce a policy violation. Absent the occurrence of an action that triggers policy enforcement or makes actions occurring during information flow propagation an actual policy violation, these policies do not have to be enforced. The label propagated with each information flow provides the necessary information to enforce policies at any time that a policy enforcement need arises. In addition, the information flows are propagated independent of how the information flow data are actually used.

Systems employing methods in accordance with the present invention mediate all accesses to memory an maintain the information-flow metadata. In one embodiment, a functional programming language is used to access and to manipulate the information flow metadata. In order to assign the multi-dimensional label to each information flow, frames are used to associate dimension values to information flow data and information flows. The frames facilitate the used of a nested structure, which permits the expression of the inter-relationships among the dimensions and the influence of not only the information flow data but the information flows themselves on the dimension values. In one embodiment, the nested structure includes dimension values for at least two different dimensions. Therefore, the frames can be used to associate partial trust relationships with information flows.

BRIEF DESCRIPTION OF THE DRAWINGS

FIG. 7 is an embodiment of an information flow language translation from the frame language;

DETAILED DESCRIPTION

Exemplary embodiments of systems and methods in accordance with the present invention provide for the tracking of information flows and in particular to information flows resulting from the execution of computer programs. In one embodiment, a functional language is used. This language, called $\lambda_I$, is an expressive language for information-flow tracking that allows for dynamic tracking of control- and data-flow in multiple, interdependent dimensions. The information-flow tracking system is an integral part of $\lambda_I$, and not a separate subsystem. The information-flow metadata is accessed and manipulated. The uses of information-flow metadata are calculated throughout the execution of a program for use in subsequent policy decisions, except for deliberate information-flow-policy violations made by trusted code. Frames on frames are utilized, fully accounting for frames used as storage channels.

Information flow policies are expressed using dimensions based on the information flow data and metadata. Information is propagated independently of the way the information will be used, and no operation on the information-flow values needs to be performed while tracking information flow. Therefore, information-flow tracking is conducted independently from the enforcement of information flow policies. Systems and methods in accordance with the present invention, maintain the full sequence of influences of the information flow. Policy-enforcement, however, is domain specific, and the present invention utilizes a lazy policy enforcement, which is triggered just before the program performs an action deemed critical to a given policy in a specific information-flow domain. This facilitates a high degree of flexibility and precision. For example, a program is allowed to continue execution even when an untrusted value $v_1$ has influenced a value $v_2$ that may be used in a trusted computation, or when a secret value $v'_1$ has influenced a value $v'_2$ that may be communicated to a public observer. If $v_2$ or $v'_2$ are never used in a security-sensitive context, there is no reason to reject the program. It is only at policy-enforcement time, for example, just before the trusted computation or the leakage of the value is performed, that the program will be rejected.

The tracking of multiple dimensions across domains is unified into a common tracking mechanism. For example, policies based upon the dimensions for integrity and confidentiality, which have a recognized duality and are interrelated, are typically enforced by separate mechanisms, despite the recognized duality of these dimensions. By separating the tracking mechanism from the policy enforcement, a single unified framework is used to track and to enforce both integrity and confidentiality. In addition, this framework is extended to other domains through the definition of appropriate policies. Systems and methods in accordance with the present invention do not impose restrictions on the types of values used to propagate information across the execution of a program. Any program value can be used to track information flow. This allows the user to easily encode domain-specific abstractions, in contrast with prior treatments of information flow, which restrict information-flow labels to be of a special form.

Exemplary embodiments of the present invention, and the languages that embody the present invention, model essential security features of popular systems, for example, endorsement and declassification. In addition, the Java doPrivileged construct (corresponding to Assert in the CLR) can be encoded, which allows trusted code to be executed regardless of the permissions of its callers, as can the Java doAs construct, which allows code to be executed under the privileges of a subject, the assignment of permissions to code by class loaders, and the presence of user-specified information-flow enforcement mechanisms.

In accordance with one embodiment, a plurality of policies are identified to be enforced on information flows using the dimension values associated with a given information flow. The information flows are tracked and the values of the dimensions are assigned to a given information flow in the form of a label. The actual enforcement of the policy, however, occurs when a policy-specific critical step is encountered, for example, a request to provide public access to data covered by a confidentiality policy. One example of a plurality of policies is the Information Management Policies in a Limited Trust Environment (IMPOLITE), which is a novel class of information-flow policies that can be enforced and that supports multiple and interdependent dimensions of information.

In one embodiment, for both integrity and confidentiality, a trusted-memory model is assumed. Although untrusted intruders can write to memory (potentially leading to integrity violations) and read from memory (potentially leading to confidentiality violations), access to memory is always mediated by the system. Therefore, the system detects all accesses to memory and manipulates the information-flow data accordingly for subsequent use at policy-enforcement time. This approach supports an active-attacker model, as described, for example, in Andrew C. Myers and Steve Zdancewic, *Robust Declassification*, Proceedings of the 14th IEEE Computer Security Foundations Workshop (CSFW-14 2004), Cape Breton, Nova Scotia, Canada, June 2001. In this model, an outside public observer can observe the behavior of the system and inject into the system an untrusted intruder, which can modify the behavior of the system, including causing non-termination. The notion of non-interference is timing-insensitive. An outside public observer can detect system calls and the program's return value, but cannot measure time intervals between those system calls. In addition, the notion of non-interference is termination-insensitive. An outside public observer cannot distinguish a program that has terminated from a program that has not terminated. Exemplary embodiments of systems and methods in accordance with the present invention, equate detected information-flow violations with non-termination. Except for these restrictions, the system of the present invention guarantees that for impolite policies an active attacker cannot compromise the integrity and confidentiality of the system.

For integrity, this attacker model allows trusted code to safely call arbitrary untrusted code injected into the system by the outside attacker. The untrusted code is even allowed to corrupt the heap or otherwise attempt to modify the behavior of the system. If this corruption affects security-critical events, those events will not be permitted. For confidentiality, systems and methods in accordance with the present invention allow arbitrary code with any secrecy level to read all of memory. However, any attempt to communicate to the outside public observer secrets that go beyond the observer's permitted secrecy level will be detected and prohibited.

Figure 1:
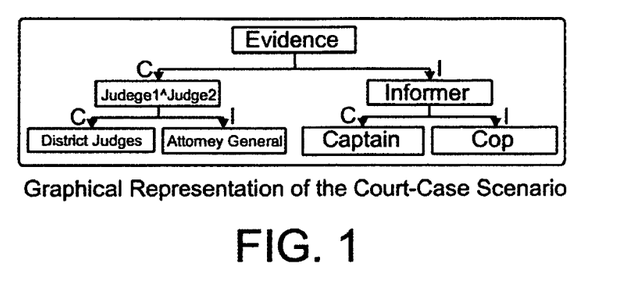
FIG. 1 is a graphical representation of a court-case scenario illustrating an embodiment of the information flow tracking method of the present invention.

Referring to FIG. 1, an exemplary embodiment illustrating the use of the flow tracking system of the present invention is provided. As illustrated, a simple court-case scenario is provided to illustrate the tracking of information flows for a information flow enforcement polices that uses the dimensions for integrity (I) and confidentiality (C). For every piece of information in the information flow, symbols C and I label the edges pointing to the confidentiality and integrity levels of that piece of information. The underlying data, Evidence, is provided as evidence in a court case. The integrity level on Evidence is Informer, since Informer is the person who provides the Evidence. As such, Evidence is trusted up to Informer. However, Informer does not state Evidence directly. Instead, Cop hears Informer saying Evidence. Therefore, the information that Informer says Evidence is trusted up to Cop. Furthermore, the fact that the integrity label on Evidence is Informer is confidential up to Captain. This means that Captain knows the identity of Informer, which Cop does not. Whoever committed the crime witnessed by Informer is probably already aware of Evidence, but that person may not be aware of the identity of Informer. Keeping the identity of Informer secret is therefore more important than keeping the Evidence itself secret, since if the identity of Informer were revealed, Informer may be killed.

Evidence also has a confidentiality label—Judge1 and Judge2. Judge1 and Judge2 are the only two people allowed to learn the Evidence. This information itself is confidential up to the set of the District Judges, and has Attorney General as its integrity label. This is another case in which the confidentiality of the confidentiality label is more critical than the confidentiality of the underlying data. Note that a confidentiality label does not necessarily indicate which principals know the information protected by that label. Rather, a confidentiality label indicates which entities are allowed to learn, directly or indirectly, from the information stored in the particular copy of the data protected by the confidentiality label. In the given example, the confidentiality policy on Evidence does not prevent the criminal from knowing the Evidence.

In accordance with one exemplary embodiment, systems and methods in accordance with the present invention are implemented using a functional language, for example, an enhanced λ calculus, that tracks information flow and provides primitives for manipulating information-flow metadata. Systems and methods in accordance with the present invention model a locally trusted memory that is not part of the outside world. Access to memory is mediated by using the functional language. Actual policy enforcement is domain specific and is performed lazily. A domain-specific policy is enforced only when a critical operation, i.e., an operation critical to a given policy, is going to be performed. For a policy utilizing the dimensions for integrity and confidentiality, any operation that would move integrity of data or information flow from untrusted to trusted or that would make secret data or information flows public, would be identified as critical operations that would be applied against the policy and prevented. The actual policy test, however, is part of the general system and is not specified by the language embodying the present invention.

In one embodiment, for technical reasons, a core language, $\lambda_F$ is presented for manipulating the metadata. The full language, $\lambda_I$ is then presented via a translation to $\lambda_F$. This provides a clean interface to the metadata operations and in particular, simplifies our later proofs.

Figure 2:
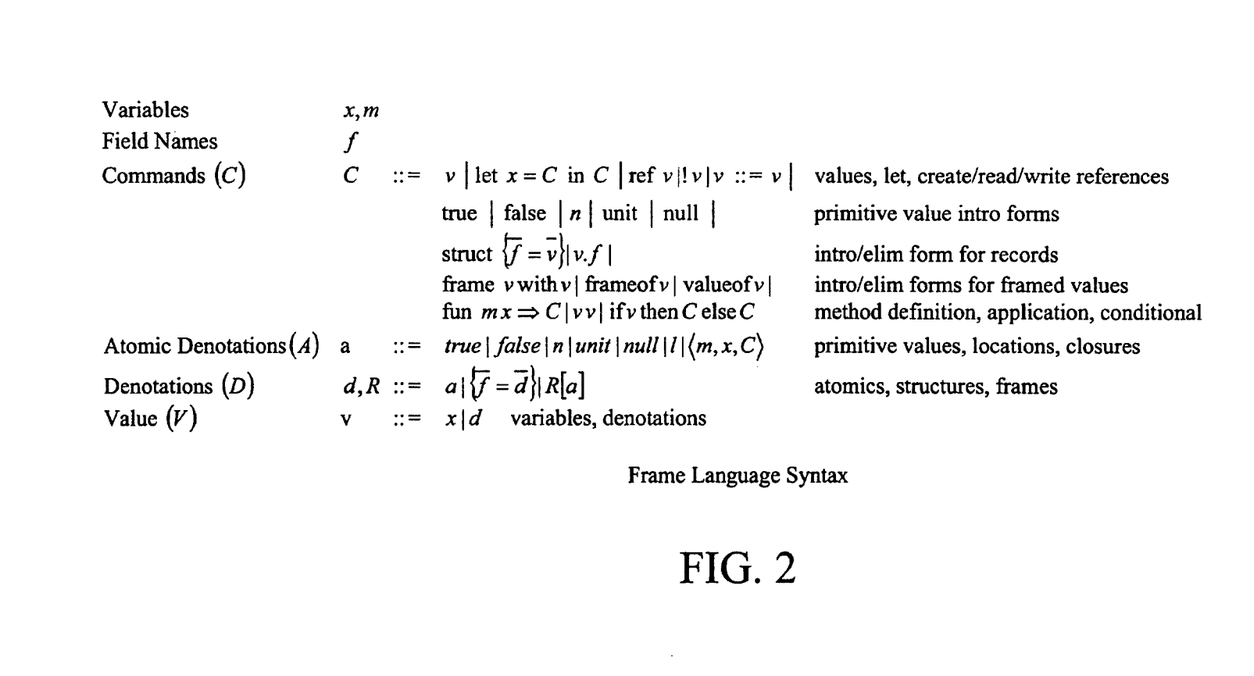
FIG. 2 is an embodiment of a frame language syntax for use in the information flow tracking system of the present invention.

Referring to FIG. 2, the syntax of $\lambda_F$, an anormalized $\lambda$ calculus with references, structures, conditionals, and recursive anonymous methods is presented. $\lambda_F$ also includes frames, which constitute a mechanism for associating information-flow metadata with data. Note that any denotation can be used for a frame, and that frames can themselves be framed. Also presented is the syntax of run-time denotations. Denotations include atomic denotations, structures and framed constructs. Framed constructs, as seen in FIG. 2, are canonicalized according to the rules illustrated in FIG. 4. Therefore, only atomic denotations are framed. Canonicalization emphasizes the underlying data, ascribing a clear, useful meaning to constructs such as R[S][3]+T[4].

As formalized by the Null Absorption property (FIG. 4), null is used as a form of frame terminator and is absorbed by framing. Struct Lifting is an assumption common to many languages, including ML. Denotations are identical to the singleton tuple (in the language illustrated a simple struct) containing that denotation. Note that the Struct Lifting and Distribution properties of FIG. 4 imply a form of associativity on frames: $d_1[d_2][d_3] \equiv d_1[d_2[d_3]]$. This interpretation is compatible with the Abadi, Burrows, Lampson, and Plotkin (ABLP) calculus for access control in distributed systems, as decribed in Martin Abadi, Michael Burrows, Butler W. Lampson, and Gordon D. Plotkin, *A Calculus for Access Control in Distributed Systems*, ACM Transactions on Programming Languages and Systems (TOPLAS), 15(4):706-734, 1993. For convenience, $d_1[d_2]$ is used for all (not necessarily atomic) denotations $d_2$ with the assumption that Canonicalization is implicitly performed as per FIG. 4.

Figure 3:
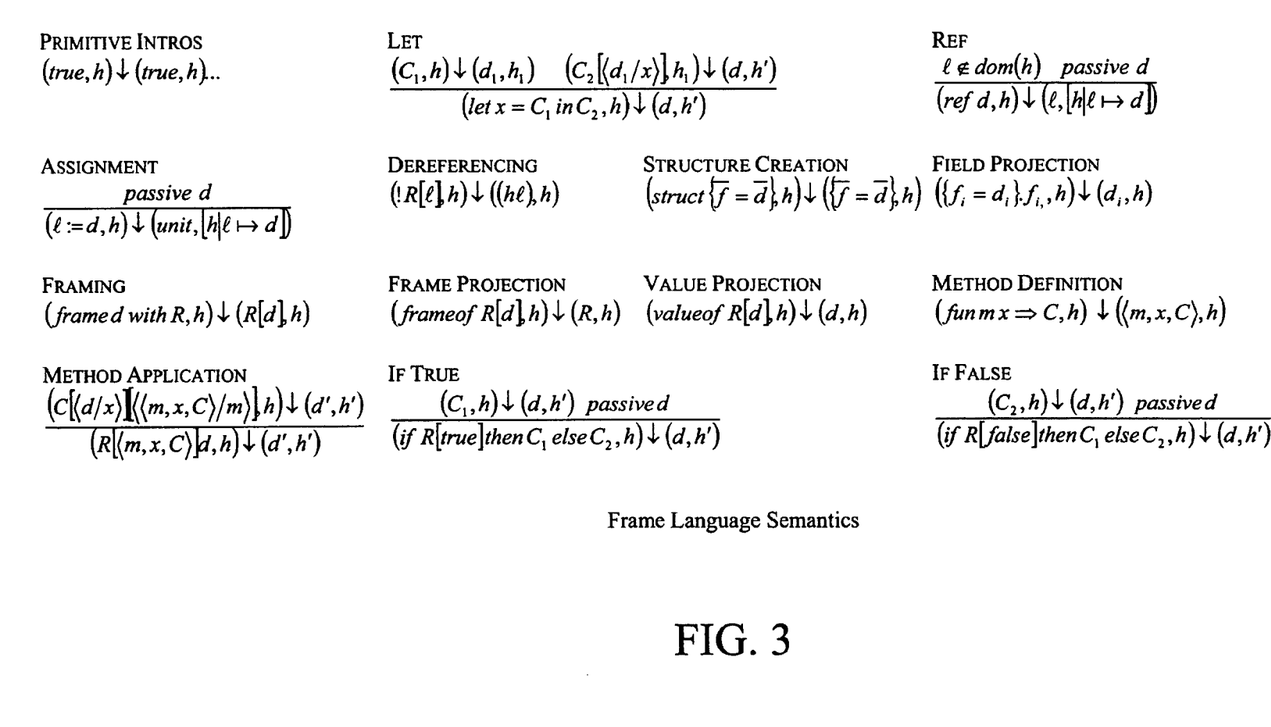
FIG. 3 is an embodiment of frame language semantics for use in the information flow tracking system of the present invention.
Figures 5, 6:
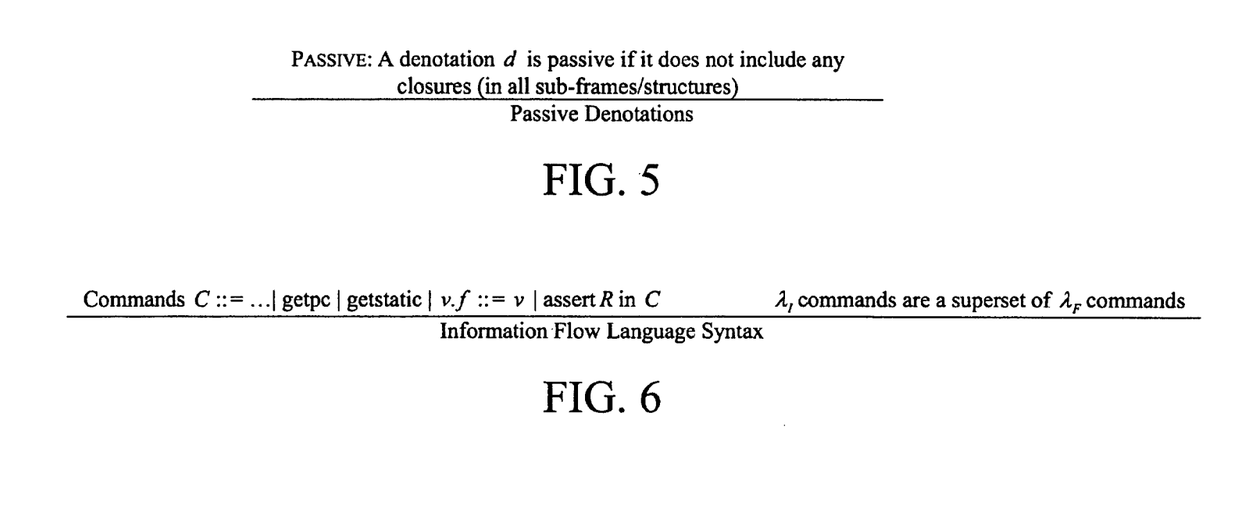
FIG. 5 is an embodiment of passive denotations.
FIG. 6 is an embodiment of an information flow language syntax for use in the information flow tracking system of the present invention.

Referring to FIG. 3, the semantics of $\lambda_F$ are described. The standard capture avoiding substitution of $d_1$ for x in d is given as $d[\langle d_1/x \rangle]$, where a slightly unconventional syntax is used to disambiguate substitution and framing. frame with, frameof and valueof are the intro and elim forms for framed constructs. passive as expressed in FIG. 5, is a predicate on denotations indicating the absence of closures within them. Only passive denotations can be put in the heap and returned from conditionals. As a result of this restriction, fix cannot be encoded in $\lambda_F$ using references and closures. Instead, $\lambda_F$ provides recursive closures as a form of fix. Also note that only bare (unframed) locations can be assigned to. In general, $\lambda_F$ provides primitives to manipulate frames but does not enforce any policies on them.

$\lambda_I$ extends $\lambda_F$ to track control- and data-flow by framing every value with its dependencies. Referring to FIG. 6, $\lambda_I$ includes all of the $\lambda_F$ commands and a few more. Referring to FIG. 7, $\lambda_I$ is defined by translation to $\lambda_F$. Programs (top-level commands) are translated by prepending two let bindings for special heap locations pc and static that are created and used by the system. pc is used to track the current control dependencies, and static is used to record the frame of the currently executing method. In addition, static is changed upon method invocation and restored upon method return. The translation proceeds recursively on the program's command and uses the $\lambda_F$ primitives to propagate dependencies as needed. For example, the ref rule taints (meaning, frames with pc) the value being written to memory, recording the influence of the current control dependencies. Dereferencing a location frames the looked-up value with the frame of the location, as the value of the location clearly influences which value will be returned.

The concept of influence is relative. In an integrity setting, code trusts itself. When code creates a value, it trusts that value, as much as it trusts the value's constituents. However, when the code tries to pass the value to other code, the value is framed with the level of trust of the receiver relative to the source. For this reason, the application rule frames the argument to a method with the trust level of the caller (its static frame) and frames the return value with the frame of the invoked method. In general, commands that return values do not need to taint those values further, because the currently executing code trusts itself (and in particular, trusts its request for that value).

$\lambda_I$ provides access to the underlying frame with, frameof and valueof commands in $\lambda_F$, allowing code to access and manipulate the information-flow metadata. In particular, this allows code to endorse and declassify data in integrity and confidentiality environments respectively. $\lambda_I$ also adds in some new commands. The command assert in allows the programmer to ignore certain control dependencies. This is akin to doPrivileged in Java and Assert in the CLR. The commands getpc and getstatic are provided to enable the programmer to access pc and static. This can be useful, for example, if a programmer wishes to only eliminate some of the control dependencies, which can be calculated using getpc.

$\lambda_I$ also adds in a more complicated assignment command that accepts field paths. This command allows the programmer to precisely specify the structural component of memory that should be assigned to. As can be seen by the translation, this can be done in $\lambda_F$. However, if this command was not provided, the system would conservatively be forced to assume that the programmer modified the entire structure stored in the target location and would have to taint it appropriately. The more complicated command allows the system to more precisely taint only the part of the substructure that was actually influenced by the code.

Figure 8:
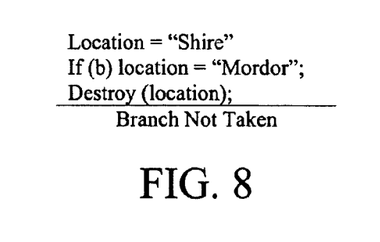
FIG. 8 is an embodiment of branch not taken scenario handled by the information flow tracking system.
Figure 9:
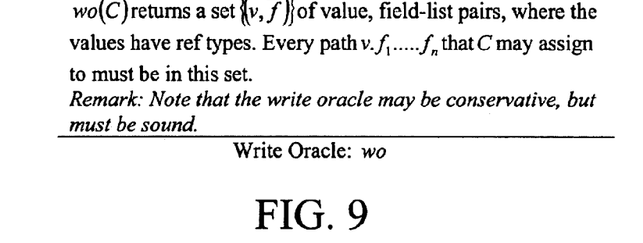
FIG. 9 is an embodiment of a write oracle.

Referring to FIG. 8, a Java example is provided. As illustrated, if an attacker can control the value of b, that attacker can choose which location is going to be destroyed. In particular, if the attacker can set b=false, then Shire will be destroyed instead of Mordor. This is an example of an attacker influencing data by preventing an action from happening. To address this issue, the translation for conditionals given in FIG. 6 assumes the existence of a write oracle, as defined in FIG. 9. This write oracle returns the set of possible locations, more precisely, the set of location, field-list pairs, that could have been written by either branch. The translation then marks these locations as having been influenced by b, accounting for these indirect flows.

Anything written to by the taken branch of the conditional will then be re-tainted as a result of it being, by necessity, in the write oracle for that branch. A more precise variant could track the set of locations actually written in the branch taken and then only taint the locations in the write oracle for either branch that where not actually written to. More formally, $(wo(C_1) \cup wo(C_2)) \setminus written$ could be used, where written is a variable maintained by the system and tracking the set of locations actually written to by the taken branch of the conditional. If the write oracle were perfect, then this would be a subset of the set returned by the write oracle on the branch not taken. However, it is unreasonable to demand a perfect write oracle. Given a conservative (but still sound) write oracle, it is not sufficient to taint only the set returned by the write oracle of the branch not taken. To understand the problem, imagine that in the example in FIG. 8, the write oracle conservatively guessed that the true branch also wrote to a different variable, tower. If the attacker does not influence b, and the true branch is run, tower will not be tainted, as it is never actually written to. However, if the attacker influences b, then the write oracle will say that tower may have been written to in the other branch, and tower will thus be tainted. The attacker would thereby be able to influence the frame on tower without detection.

Preventing indirect flows, where the attacker can influence the system by preventing an action from happening, motivates other features of the present invention. In particular, $\lambda_F$, and hence $\lambda_I$, only allow assignments to bare locations. In principle, $\lambda_I$ could allow assignment to framed locations. In that case, however, the indirect flows would have to be accounted for. An attacker could corrupt the location being written to. It would be easy to track the influence that the attacker has on the value stored into that location. What is more difficult to address is the influence this change has on the other locations that are not written. As in the conditional case, an attacker can cause a location not to be assigned a value by changing the reference to a different one. Correctly addressing this indirect flow would require tainting the entire heap. To avoid this, we simply do not allow assignments to untrusted locations. This is a relative notion. The location must be completely trusted by the code performing the assignment, not by anyone else. In practice, this forces code to endorse (with valueof) locations before they can write to them.

Figure 10:
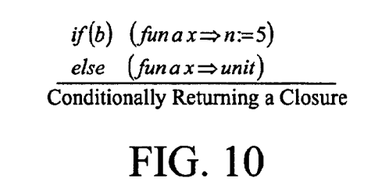
FIG. 10 is an embodiment of conditionally returning a closure.

In a further restriction of $\lambda_F$ and hence $\lambda_I$, denotations put in the heap and returned from conditionals are passive. These restrictions also address indirect flows. Referring to FIG. 10, a pseudo-code for a command that returns one of two closures depending on b is presented. If the trusted code invokes the returned method, hen by falsifying b an attacker can cause n to not be written, which as explained previously, is potentially an information-flow violation. The write oracle does not return n, as n is not written to in the conditional. The conditional simply returns a closure that when invoked writes to n. A similar problem exists for locations in the heap, which necessitates the passive restriction on denotations in the heap.

Some simple properties that hold of $\lambda_I$ are observed.
Lemma 4.1 (Properties of Semantics).
Passive Heaps: Heaps only contain passive denotations.
Heaps Grow: $(C_1, h_1) \downarrow (v, h_2) \Rightarrow \text{dom } h_1 \subset \text{dom } h_2$
No Garbage: If$(C, h) \downarrow (d, h')$, then the free locations ind are all in dom h'.
Proof Sketch: Proof is immediate by inspection of the semantics $\lambda_F$ and the translation from $\lambda_I$.

Figure 4:
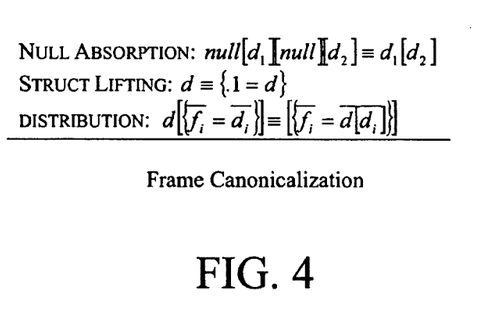
FIG. 4 is an embodiment of frame canonicalization to be applied to the frame language.

Regarding the fundamental expressivity gain from the presence of structures in $\lambda_F$ and $\lambda_I$, structures can be used to encode multiple dimensions of information. In particular, the Frame Canonicalization property of FIG. 4 gives a succinct characterization of the interplay between frames and structures. This gives $\lambda_I$ the ability to track multiple dimensions of information in an interdependent fashion. The most common domain for information-flow policy is security, particularly integrity and confidentiality enforcement. Systems and methods in accordance with the present invention are able to model many desirable security-related primitives. Two common primitives in information-flow-based security systems are endorse and declassify. In an integrity domain, endorsement allows trusted code to accept an untrusted value as trusted, typically after verifying some property of the data. In a confidentiality domain, declassification allows trusted code to reveal private data to unprivileged public parties. Both represent deliberate security violations. $\lambda_I$ allows both of these primitives to be expressed using valueof.

Another common primitive in security-related systems allows code to run with different permissions. Java, for example provides doAs to allow code to run with the permissions of an authenticated principal, as described, for example, in Charlie Lai, Li Gong, Larry Roved, Anthony J. Nadalin, and Roland Schemers, *User Authentication and Authorization in the Java™ Platform*, Proceedings of the 15th Annual Computer Security Applications Conference, pages 285-290, Scottsdale, Ariz., USA, December 1999. In $\lambda_I$, this can be encoded by simply endorsing a closure with a different principal's permissions. When that closure is invoked, it will run with the altered permissions.

Exemplary embodiments of systems and methods in accordance with the present invention can grant class loaders partial trust. In $\lambda_I$, security decisions made by the class loader will be framed by the trust level of the class loader. As such, those security decisions will be trusted only up to the class loader itself.

Dynamically changeable security managers can also pose a similar problem. Anyone that has permission to change the current security manager is implicitly granted all permissions. In $\lambda_I$, anyone can set the security manager. However that security manager's decisions will only be trusted up to the trust level of the code that set it. In $\lambda_I$, security manager tests can be encoded using frameof and conditionals, and all the dependencies are accounted for automatically.

One exemplary embodiment of a class of information flow policies utilizing a plurality of dimensions and the interrelationships among these dimensions are the Information Management Policies in a Limited Trust Environment. In one embodiment, these policies use confidentiality, integrity and the interrelationship between confidentiality and integrity. Regarding integrity, the assumption is made that there is some crucial data, for example evidence in a court case, which has been vouched for by a a third party, e.g., a mafia informer. In accordance with the present invention, this is modeled as Informer[Evidence], meaning that Evidence is trusted up to (has an integrity rating of) Informer. Evidence is the underlying data, and Informer is an integrity frame on that underlying data.

Informer may not be able to present the actual evidence in court. Instead, Informer may have told Cop the information, and Cop vouches that Informer in fact stated Evidence. Our system models this as Cop[Informer][Evidence], meaning that Cop says that Informer says Evidence. The information flow policy allows for valid-for relationships to address the situation where Cop may be partially trusted. Cop is not trusted to have witnessed Evidence. However, Cop is trusted to repeat what Informer said. This is reminiscent of the ABLP logic speaks-for relationship.

Evidence may be confidential. If the mafia is able to access the information, Informer might not survive. In particular, Evidence should only be readable by the presiding judges. Looking for a moment only at confidentiality, this would be modeled as Judges [Evidence].

Judges may be an aggregate. In particular, there might be two judges, J1 and J2. The aggregate judges are modeled as {part1=J1, part2=J2}[Evidence], a structure containing both judges as fields.

In addition to modeling confidentiality and integrity requirements on Evidence separately, these dimensions can be modeled together, as the same piece of Evidence, however, requires both. This combination is modeled as {C={part1=J1, part2=J2}, I=Informer}[Evidence]. Integrity and confidentiality are different dimensions of information, encoded as the I and C fields of the structure.

This example is extended to handle limited-trust relationships. As before, Cop may be repeating what Informer said. With the validfor relationship, situations in which Cop is not directly trusted concerning Evidence but is trusted to correctly repeat Informer are described. There might also be another complication in this case. If the mafia uncovers the identity of the presiding judge, they may be subject to harassment. Therefore, the fact that Evidence is confidential to J1, J2 needs to be kept confidential, perhaps to the District Judges, DJ.

The full example, graphically represented in FIG. 1, is presented. The situation where Cop does not know the identity of Informer is modeled. Captain, however, knows it. If the Cop does know the identity of Informer, then the confidentiality of Informer would be the union of Cop and Captain, similar to the case of J1, J2. Additionally, the fact that only J1, J2 can access Evidence (the confidentiality label), itself has an integrity label, AG (Attorney General). Note that in this example, there are integrity labels on confidentiality, and vice versa. The validfor relationship can precisely decide what integrity labels are trusted on a given confidentiality label, and vice versa. In this example, two dimensions of information or information flows, integrity and confidentiality, have been presented. In general, the system can model arbitrary dimensions of information, with inter-dimensional relationships such as validfor. The key policy decision is the validfor relation. This relation is an encoding of the administrator's view of the trust relationships between principals (or more generally, some abstraction thereof). It is assumed to pre-exist, and parameterizes the IMPOLITE system.

A formal description of the general impolite system described above is now provided.

Definition 5.1 ($\models$=(validfor)).

Define $\models$ as a relation $$\models \subseteq (F \times A) \times (F \times A)$$

that satisfies

No Data: ("",a)$\models$("",null)
On Frames: (f,a)$\models$("",a') $\Rightarrow$ (f,a)$\models$("",a")
Remark: Read $(f_1,a_1)\models(f_2,a_2)$ as $(f_1,a_1)$validfor$(f_2,a_2)$.

No Data and On Frames guarantee that $\models$ does not depend on the underlying data. For technical reasons, " " is a special field name used for the underlying data, which are at the leaves of the denotation. The validfor relation, as described above, encodes partial trust relations. In the mafia example, Evidence is the underlying data, and (C, Captain)$\models$(I, Informer) encodes that Captain is allowed to access the information that Informer is the integrity label on Evidence.

Definition 5.2 (join). Define join as a Predicate $$\text{join}: F \to \{F \times \text{bool}\} \to \text{bool}$$

that satisfies

Monotonicity: join f $\{f_i = b_i\} \Rightarrow$ join f $\{f_i = b_i \Rightarrow c_i\}$
Top Conjunction: join"" $\{f_i = b_i\} \equiv \wedge_i b_i$
Remark: Monotonicity requires that if join returns true, it will continue returning true even if some of the (previously false) booleans are made true. Top Conjunction requires that all components of the underlying data must pass the test.

In the running example, both J1 and J2 were permitted to access Evidence. This was encoded using a structure with field names part1 and part2. The predicate join is used to determine how to handle aggregates such {part1=J1, part2=J2}. Given the context C and the field names part1, part2, the join predicate in the running example would return true if either judge attempts access (as in standard literature on confidentiality). As long as the join predicate satisfies the above properties, it may implement more complicated decisions, such as always requiring the presence of a specific judge, along with one of two other judges.

A full (parameterized) test for IMPOLITE can now be stated.

Definition 5.3 (IMPOLITE Test).

For some ($\models$, join) per Definitions 5.1 and 5.2, define test:

| | | |
|---|---|---|
| test d | = | joiner("", null), ("", d) |
| tester ($f_{par}$, $a_{par}$) $\{f_i = d_i\}$ | = | $\wedge_i$ joiner ($f_{par}$, $a_{par}$) ($f_i$, $d_i$) |
| tester (_, _)null | = | true |
| joiner ($f_{par}$, $a_{par}$) $f_{cur}$ $\{f_i = d_i\}$ | = | join $f_{cur}$ $\{f$ = joiner ($f_{par}$, $a_{par}$) $f_{cur}$ $d_i\}$ |
| joiner ($f_{par}$, $a_{par}$) $f_{cur}$d[a] | = | $(f_{cur}, a) \models (f_{par}, a_{par}) \wedge$ tester($f_{cur}$, a)d |

As described, test recursively descends down the structure of denotation d, using helper methods tester and joiner. The method tester is called on frames and recurses on all dimensions of information. The method joiner recurses on frames. When given a framed denotation, it checks for validity of the contents with respect to its parent (what it, in turn, is framing), and then uses tester to recurse on the frame. When given a structure, it uses joiner to test all of the structure's components, and then uses join to determine the result. In the mafia example, note that tester would be invoked on the structures that encode different dimensions, whereas joiner would be invoked on the aggregate {part1=J1, part2=J2}.

To state the non-interference result, the following definition is used

Definition 5.4 (Completely Invalid).

Let $\models$* be the transitive closure of $\models$. Then (F, U) is completely invalid if (F, U)$\models$*("", null). This definition is then lifted to structures. A structure is completely invalid if all of its components are completely invalid.

In a general limited-trust environment, non-interference does not hold. By definition, a limited-trust environment depends on unproven assumptions about the behavior of the code. Nevertheless, noninterference can be proven for a stylized program which only allows for attackers that are framed by a completely invalid denotation. Nothing these attackers do will ever pass the IMPOLITE test. DEFINITION 5.5 (Safe), safe C is a predicate on commands indicating that they do not contain valueof, frameof, or assert in.

The relationships valueof, frameof, and assert in can all be used to violate information flow. In particular, valueof allows the core system to "forge" attacker influences. Endorsement and Declassification, common forms of (deliberate) information flow violations in integrity and confidentiality contexts, can be built on top of valueof. frameof allows code to detect what influences are on a value. The following integrity based example illustrates the possible violations this can enable. An attacker can choose to write to a location in memory. The trusted code can then use frameof to make a decision based on whether or not the attacker tainted the location stored in that value. Using the value itself is not a problem; however, frameof allows the trusted code to detect that the attacker chose to write something to that location, leaking a single bit of information. assert v in C' allows core code to ignore that it was called (and hence influenced by) an attacker. If the code writes to a location in memory, then this allows the attacker to cause that write to happen without the attacker's influence being tracked.

The non-interference result is now formulated by the following theorem. THEOREM 5.1 (Non-interference). Consider a safe $\lambda_I$ command C, completely invalid (Def 5.4) denotations $U_i$, $U''_i$, $U'_i$, $U'''$ and commands $C_i$, $C'_i$. Suppose $([\text{let } \overline{x_i}=\text{frame}(\text{assert}\overline{U_i} \text{ in } \overline{C_i})\text{with}\overline{U''_i} \text{ in } C], 0) \downarrow (d_1, h_1)$ $([\text{let } \overline{x_i}=\text{frame}(\text{assert}\overline{U'_i} \text{ in } \overline{C'_i})\text{with } \overline{U'''_i} \text{ in } C], 0) \downarrow (d_2, h_2)$ Then, up to locations, $\text{test } d_1 \hat{}\text{ test } d_2 \Rightarrow \text{valueof } d_1 = \text{valueof } d_2$ Two runs of a core program C are observed in different environments. Completely invalid attackers are allowed to set up the initial environments in the two runs. Attacker code (and any closures it puts into the environment) can be written in the full language. They do not have to be safe. The theorem then states that if the IMPOLITE test succeeds in both cases, then the underlying values were not influenced by the attacker code.

As described above, valueof, frameof, and assert in potentially violate information flow, and Theorem 5.1 therefore only applies to programs where the trusted code is safe. To be more precise, if the result of using one of these operations affects the final result, the final result the information flow policy may be violated, otherwise there is no problem. To formalize this, assume the existence of a completely invalid $\epsilon$. valueof and frameof could be modified to taint their return value with $\epsilon$, and assert in modified to taint the pc with $\epsilon$. The non-interference theorem would then hold without needing any restriction on the safety of the trusted code. This would allow information flow violations, as long as they have no influence on the final result, using information flow tracking mechanism to precisely identify and check for possible influences.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for tracking information flows in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for information flow tracking, the method comprising using a computing system executing a software program for:

identifying a plurality of dimensions, each dimension quantifying a property associated with information flows, the information flows resulting from execution of computer programs;

using the plurality of dimensions to express a plurality of information flow policies governing accesses to and uses of the information flows, the plurality of dimensions in each information flow policy comprising dimension values resulting from the information flows, the dimension values used to determine compliance with each information flow policy, and the plurality of dimensions in each information flow policy comprising interrelationships among dimensions, each interrelationship comprising a first dimension quantifying a property of a second dimension having an associated dimension value;

arranging the plurality of policies into a plurality of domains based on common type of policy;

tracking the information flows across all domains;

accessing information flow data and associated information flow metadata for each tracked information flow, the information flow metadata comprising the dimension values for one or more of the plurality of identified dimensions and the interrelationships among dimensions, the dimension values associated with data values for data in each information data flow, each dimension value recording an influence on its associated data value by a given information flow control;

assigning a multi-dimensional label to each tracked information flow, the multi-dimensional label comprising the data values derived from the information flow data and the associated dimension values derived from the information flow metadata; and propagating each tracked information flow with the assigned multi-dimensional label.

2. The method of claim 1, further comprising tracking the information flows independent of enforcing policies covering the information flows.

3. The method of claim 1, further comprising utilizing the values of the identified dimensions and the interrelationships among the identified dimensions for policy enforcement.

4. The method of claim 1, wherein the information flows comprise data flows and control flows.

5. The method of claim 1, further comprising:
triggering domain specific policy enforcement just prior to an occurrence of an action deemed critical by at least one of the policies in a given domain.

6. The method of claim 1, wherein the domains comprise an integrity policy domain, a confidentiality policy domain, a non-repudiation policy domain, a security policy domain, and a provenance policy domain.

7. The method of claim 1, wherein the step of accessing the information flow metadata further comprises using a functional programming language.

8. The method of claim 1, further comprising propagating the information flows independent of how the information flow data are used.

9. The method of claim 1, further comprising mediating all accesses to memory and maintaining information-flow metadata.

10. The method of claim 1, wherein the step of assigning the multi-dimensional label further comprises using frames to associate the dimension values with the information flow data values in the information flows.

11. The method of claim 10, wherein the frames comprise a nested structure.

12. The method of claim 11, wherein the nested structure comprises dimension values for at least two different dimensions.

13. The method of claim 10, wherein the step of using frames further comprises using frames to associate partial trust relationships derived from information flow controls with information flows.

14. A non-transitory computer-readable medium containing a computer-readable code that when read by a computer causes the computer to perform a method for information flow tracking, the method comprising:

identifying a plurality of dimensions, each dimension quantifying a property associated with information flows, the information flows resulting from execution of computer programs;

using the plurality of dimensions to express a plurality of information flow policies governing accesses to and uses of the information flows, the plurality of dimensions in each information flow policy comprising dimension values resulting from the information flows, the dimension values used to determine compliance with each information flow policy, and the plurality of dimensions in each information flow policy comprising interrelationships among dimensions, each interrelationship comprising a first dimension quantifying a property of a second dimension having an associated dimension value;

arranging the plurality of policies into a plurality of domains based on common type of policy;

tracking the information flows across all domains;

accessing information flow data and associated information flow metadata for each tracked information flow, the information flow metadata comprising the dimension values for one or more of the plurality of identified dimensions and the interrelationships among dimensions, the dimension values associated with data values for data in each information data flow, each dimension value recording an influence on its associated data value by a given information flow control;

assigning a multi-dimensional label to each tracked information flow, the multi-dimensional label comprising the data values derived from the information flow data and the associated dimension values derived from the information flow metadata; and propagating each tracked information flow with the assigned multi-dimensional label.

15. The non-transitory computer-readable medium of claim 14, wherein the method further comprises utilizing the values of the identified dimensions and the interrelationships among the identified dimensions for policy enforcement.

16. The non-transitory computer-readable medium of claim 14, wherein the information flows comprise data flows and control flows.

17. The non-transitory computer-readable medium of claim 14, wherein the method further comprises:
triggering domain specific policy enforcement just prior to an occurrence of an action deemed critical by at least one of the policies in a given domain.

18. The non-transitory computer-readable medium of claim 14, wherein the step of assigning the multi-dimensional label further comprises using frames to associate the dimension values with the information flow data values in the information flows.

19. The non-transitory computer-readable medium of claim 18, wherein the frames comprise a nested structure.

20. The non-transitory computer-readable medium of claim 19, wherein the nested structure comprises dimension values for at least two different dimensions.

* * * * *